(12) United States Patent
Amit et al.

(10) Patent No.: US 11,468,358 B2
(45) Date of Patent: Oct. 11, 2022

(54) FRAMEWORK FOR SEMI-SUPERVISED LEARNING WHEN NO LABELED DATA IS GIVEN

(71) Applicant: Palo Alto Networks (Israel Analytics) Ltd., Tel Aviv (IL)

(72) Inventors: Idan Amit, Ramat Gan (IL); Eyal Firstenberg, Ramat HaSharon (IL); Yinnon Meshi, Kibbutz Revivim (IL)

(73) Assignee: PALO ALTO NETWORKS (ISRAEL ANALYTICS) LTD., Tel Aviv (IL)

( * ) Notice: Subject to any disclaimer, the term of this patent is extended or adjusted under 35 U.S.C. 154(b) by 1157 days.

(21) Appl. No.: 16/005,713

(22) Filed: Jun. 12, 2018

(65) Prior Publication Data

US 2019/0164086 A1 May 30, 2019

Related U.S. Application Data (60) Provisional application No. 62/592,436, filed on Nov. 30, 2017.

(51) Int. Cl.
*H04L 9/40* (2022.01)
*G06N 5/04* (2006.01)
*G06N 20/00* (2019.01)
*G06F 21/55* (2013.01)

(52) U.S. Cl.
CPC .......... *G06N 20/00* (2019.01); *G06F 21/552* (2013.01); *G06N 5/04* (2013.01); *H04L 63/1416* (2013.01); *H04L 63/1466* (2013.01)

(58) Field of Classification Search
None
See application file for complete search history.

(56) References Cited

U.S. PATENT DOCUMENTS

2014/0165207 A1 6/2014 Engel et al.
2015/0358344 A1 12/2015 Mumcuoglu et al.

OTHER PUBLICATIONS

Francois., "PAC Learning from Positive Statistical Queries", ALT '98 Proceedings of the 9th International Conference on Algorithmic Learning Theory, pp. 112-126, Oct. 8-10, 1998.

(Continued)

*Primary Examiner* — Brian Whipple
(74) *Attorney, Agent, or Firm* — Kliger & Associates Patent Attorneys Ltd (57) ABSTRACT

A method, including collecting communication sessions, and generating samples from the sessions. Classifiers are applied to the samples, thereby computing a classifier prediction for each sample, and based on the classifier predictions, respective aggregated predictions are determined for the samples. Based on the classifier and the aggregated predictions, a precision and a hit rate for each classifier and a positive rate are computed, and based on the aggregated predictions, a subset of the samples are selected. Using the selected subset, a model including the classifiers is computed based on the precisions, the hit rates and the positive rate, and the model is applied to the samples, thereby updating the classifier and the aggregate predictions. The steps of computing the precision and the hit rate, selecting the subset, computing the model and applying the model are repeated until meeting a halting condition, and using the model, additional communication sessions are scanned.

27 Claims, 5 Drawing Sheets

(56) References Cited

OTHER PUBLICATIONS

Settles., "Active Learning Literature Survey", Computer Sciences Technical Report 1648, University of Wisconsin—Madison, 67 pages, Jan. 26, 2010.

Dhagat., "PAC learning with irrelevant attributes", Proceedings of the IEEE Symposium on Foundation of Computer Science, 11 pages, 1994.

Chvatal., "A Greedy Heuristic for the Set-Covering Problem", Mathematics of Operations Research, vol. 4, issue 3, pp. 233-235, Aug. 1979.

Schapire., "The Strength of Weak Learnability", Machine Learning, vol. 5, pp. 197-227, 1990.

Dawid et al., "Maximum Likelihood Estimation of Observer Error-Rates Using the EM Algorithm", Journal of the Royal Statistical Society Series C (Applied Statistics), vol. 28, No. 1, pp. 20-28, 1979.

Blum et al., "Combining Labeled and Unlabeled Data with CoTraining", COLT' 98 Proceedings of the 11th annual conference on Computational learning theory, pp. 92-100, 1998.

Kearns et al., "Crytographic limitations on learning Boolean formulae and finite automata", Proceedings of the 21st Annual ACL Symposium on Theory of Computing, vol. 21, 44 pages, May 14-17, 1989.

Valiant., "A theory of the learnable", Communications of the ACM, vol. 27, No. 11, pp. 1134-1142, 1984.

Dempster., "Maximum Likelihood from Incomplete Data via the EM Algorithm", Journal of the Royal Statistical Society, Series B (Methodological), vol. 39, No. 1, pp. 1-38, 1977.

Ratner., "Data Programming:Creating Large Training Sets, Quickly", 27 pages, May 26, 2016 (downloaded from htttps://arxiv.org/abs/1605.07723).

Coraluppi et al., "Stochastic Signal Representation", IEEE Transactions on Circuit Theory, vol. 16, issue 2, pp. 155-161, May 1969.

FRAMEWORK FOR SEMI-SUPERVISED LEARNING WHEN NO LABELED DATA IS GIVEN

CROSS-REFERENCE TO RELATED APPLICATIONS

This application claims the benefit of U.S. Provisional Patent Application 62/592,436, filed Nov. 30, 2017, which is incorporated herein by reference.

FIELD OF THE INVENTION

The present invention relates generally to machine learning, and particularly to creating a framework for performing semi-supervised learning.

BACKGROUND OF THE INVENTION

In machine learning, computers can "learn" without being programmed to perform specific tasks. Examples of machine learning include supervised learning, unsupervised learning, semi-supervised learning and active learning. In supervised learning, classification functions are trained using labeled data (i.e., a subset of the data that is tagged with one or more labels). In unsupervised learning, classification cannot be performed since there is no labeled data. In semi-supervised learning, there is a small amount of labeled data and a much larger amount of unlabeled data. Therefore, semi-supervised learning falls between unsupervised learning (without any labeled training data) and supervised learning (with completely labeled training data).

Similar to unsupervised learning, active learning starts off with unlabeled samples, and the goal is to identify the most beneficial samples to label. To label the identified samples, active learning algorithms can access an information source (e.g., a user) for the labels. Active learning can be performed in situations where unlabeled data is abundant and where manually labeling is expensive.

Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention a method, including collecting, by a processor, communication sessions including data packets transmitted over a network, generating a plurality of samples from the collected data packets, applying multiple classifiers to the samples, thereby computing a classifier prediction for each of the samples, each of the predictions indicating whether or not a given communication session indicates malicious activity, determining, based on the classifier predictions, an aggregated prediction for each of the samples, computing, based on the classifier predictions and the aggregated predictions, a precision and a hit rate for each of the classifiers and a positive rate, selecting, based on the aggregated predictions, a subset of the samples, computing, using the selected subset and based on the precisions and the hit rates of the classifiers and the positive rate, a classification model including the classifiers, applying the classification model to the samples to update the classifier predictions and the aggregate predictions for the samples, repeating over multiple iterations the steps of computing the precision and the hit rate, selecting the subset, computing the classification model and applying the classification model until a halting condition is met, and scanning, using the classification model, additional communication sessions including additional data packets.

In some embodiments, the classifiers include weakly-useful predictors defined by one or more domain experts. In additional embodiments, the method includes generating, using one or more semi-supervised learning methods, the classifiers. In further embodiments, selecting the subset prior to performing the iterations includes selecting a plurality of the samples that have predictions with a high confidence.

In one embodiment, selecting the subset during the iterations includes selecting a plurality of the samples that have disagreements in their classifier predictions, and the method includes receiving manual labels for selected subset, wherein the predictions for the selected subset includes the manual labels. In another embodiment, the method includes adapting the classifiers to a natural distribution of the samples.

In supplemental embodiments, selecting the subset during the iterations includes computing, for each given sample, a score based on the aggregate prediction for the given sample and the computed hit rates, precisions and positive rate. In some embodiments, computing the classification model includes computing a Naïve Bayes probability using the classifiers. In alternative embodiments, computing the classification model includes computing a score for each of the classifiers by applying a linear regression algorithm or a logistic regression algorithm to the classifiers.

In one embodiment, the halting condition includes detecting a minimal change in the predictions during the multiple iterations. In another embodiment, the halting condition includes detecting minimal changes in the precisions during the multiple iterations. In an additional embodiment, the halting condition includes repeating the steps of computing the precision and the hit rate, selecting the subset, computing the classification model and applying the classification model a specific number of times.

In further embodiments, computing the classification model includes computing parameters for the model that minimizes entropy less mutual information with a concept of the samples.

There is also provided, in accordance with an embodiment of the present invention, an apparatus, including a probe, and at least one processor configured to collecting, from the probe, communication sessions including data packets transmitted over a network, to generate a plurality of samples from the collected data packets, to apply multiple classifiers to the samples, thereby computing a classifier prediction for each of the samples, each of the predictions indicating whether or not a given communication session indicates malicious activity, to determine, based on the classifier predictions, an aggregated prediction for each of the samples, to compute, based on the classifier predictions and the aggregated predictions, a precision and a hit rate for each of the classifiers and a positive rate, to select, based on the aggregated predictions, a subset of the samples, to compute, using the selected subset and based on the precisions and the hit rates of the classifiers and the positive rate, a classification model including the classifiers, to apply the classification model to the samples to update the classifier predictions and the aggregate predictions for the samples, to repeat over multiple iterations the steps of computing the precision and the hit rate, selecting the subset, computing the classification model and applying the classification model until a halting condition is met, and to scan, using the classification model, additional communication sessions including additional data packets.

There is additionally provided, in accordance with an embodiment of the present invention, a computer software product, the product including a non-transitory computer-readable medium, in which program instructions are stored, which instructions, when read by a computer, cause the computer to collect communication sessions including data packets transmitted over a network, to generate a plurality of samples from the collected data packets, to apply multiple classifiers to the samples, thereby computing a classifier prediction for each of the samples, each of the predictions indicating whether or not a given communication session indicates malicious activity, to determine, based on the classifier predictions, an aggregated prediction for each of the samples, to compute, based on the classifier predictions and the aggregated predictions, a precision and a hit rate for each of the classifiers and a positive rate, to select, based on the aggregated predictions, a subset of the samples, to compute, using the selected subset and based on the precisions and the hit rates of the classifiers and the positive rate, a classification model including the classifiers, to apply the classification model to the samples to update the classifier predictions and the aggregate predictions for the samples, to repeat over multiple iterations the steps of computing the precision and the hit rate, selecting the subset, computing the classification model and applying the classification model until a halting condition is met, and to scan, using the classification model, additional communication sessions including additional data packets.

There is further provided, in accordance with an embodiment of the present invention a method, including receiving, from a set of classifiers, respective predictions for a set of samples, identifying, by a processor, a subset of the samples having disagreements in their predictions, receiving labels for the samples in the subset, and using the identified subset of the samples and their respective labels to compute a classification model including the set of classifiers.

In some embodiments, the method includes identifying pairs of the classifiers having disagreements in their predictions, and wherein identifying the subset of the samples having disagreements in their predictions includes identifying a minimum set of the samples that cover the disagreements by the pairs of the classifiers. In additional embodiments, computing the classification model includes adapting the classifiers to a natural distribution of the set of the samples.

There is also provided, in accordance with an embodiment of the present invention, an apparatus, including a probe, and a processor configured to receive, from a set of classifiers, respective predictions for a set of samples, to store the respective predictions to a memory, to identify a subset of the samples having disagreements in their predictions, to receive labels for the samples in the subset, and to use the identified subset of the samples and their respective labels to compute a classification model including the set of classifiers.

There is additionally provided, in accordance with an embodiment of the present invention, a computer software product, the product including a non-transitory computer-readable medium, in which program instructions are stored, which instructions, when read by a computer, cause the computer to receive, from a set of classifiers, respective predictions for a set of samples, to identify a subset of the samples having disagreements in their predictions, to receive labels for the samples in the subset, and to use the identified subset of the samples and their respective labels to compute a classification model including the set of classifiers.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Many classification projects start with large amounts of unlabeled data and without any labeled data. Embodiments of the present invention describe a framework that can use domain knowledge in order to perform active learning, and to find an initial dataset of classified (e.g., labeled) data. In some embodiments, this initial dataset can then be leveraged in a semi-supervised manner in order to enable working in the supervised learning framework. In operation, this framework is especially valuable when the data set is imbalanced and finding positives is difficult.

For example, while there is plenty of unlabeled data in the cybersecurity domain, typically only a tiny fraction of the data is of interest (referred to herein as "positives") in identifying malicious activity. Since the positive rate is low, manual labeling of random samples is typically impractical due to its high cost and the low expected number of positives.

In the cybersecurity domain, typical approaches for detecting malicious activity have included using unsupervised learning techniques such as anomaly detection. However, these approaches can suffer from disadvantage such as (a) the malicious activity has a human behind it and humans cannot be modeled with a few Gaussians, and (b) a sophisticated attacker will try to resemble the benign activity and therefore will not appear as anomalous.

Embodiments of the present invention provide methods and systems for performing semi-supervised or unsupervised learning when no labeled data is provided. As described hereinbelow, communication sessions comprising data packets transmitted over a network are collected, and a plurality of samples are generated from the collected data packets. Multiple classifiers are then applied to the samples, thereby computing multiple respective classifier predictions for each of the samples, each of the predictions indicating whether or not a given communication session indicates malicious activity. Based on the classifier predictions, an aggregated prediction for each of the samples is determined, and based on the classifier predictions and the aggregated predictions, a precision and a hit rate for each of the classifiers and a positive rate are computed. Based on the aggregated predictions, a subset of the samples are selected, and using the selected subset and based on the precisions and the hit rates of the classifiers and the positive rate, a classification model comprising the classifiers is computed. The classification model is applied to the samples to update the classifier predictions and the aggregate predictions for the samples, and the steps of computing the precision and the hit rate, selecting the subset, computing the classification model and applying the classification model are repeated over multiple iterations until a halting condition is met. The classification model can then be deployed to scan additional communication sessions comprising additional data packets.

For example, a classification model generated using embodiments of the present invention can be used to detect bind shell attacks. In a bind shell attack (also known as a forward shell attack), an attacker controls computer A and wants to control computer B as well. Due to the use of firewalls, it is common that one can open sessions from A to B but not the other way around. Consider a case in which computer B runs a service listening to a port P1, and that this service has a vulnerability that the attacker knows how to exploit. The attacker will create a session from A to B via port P1, and will send a payload that will exploit the vulnerability. The payload will run on B, use the vulnerability and will open a new service that will listen to a port P2, as decided by the attacker. The attacker will create a new session from A to B to port P2, thereby gaining to ability to work on computer B.

This kind of attack is common, and can be implemented by using attack tools such as Metasploit®. From the network point of view, the attack looks like a pair of sessions from A to B. However, such pairs of sessions are very common, and the probability of the pairs of sessions of being malicious (i.e., indicating malicious activity) is lower than 0.1%. Therefore, a goal of the framework implementing embodiments of the present invention is to identify the bind shell attacks among these sessions.

One goal of the framework presented in embodiments described herein is to transition from an unsupervised framework into a supervised one by performing the following steps: First, domain knowledge is used in order to obtain weakly-useful classifiers, and these weakly-useful predictors are evaluated in order to identify the most likely positives. Next, a new and novel active learning algorithm is used in order to identify informative samples that can then be labeled. Once there is a set of labeled samples, the novel semi-supervised learning described hereinbelow can then be used to build a classification model based on the weakly-useful predictors.

One innovation of this framework is the ability to generate calibrated classifiers and predictions when no labeled data is given. Also, the active learning algorithm and the bound on the samples (i.e., the sample size) are novel. Another novelty of the algorithm used by the framework is adapting the classification model to the natural distribution (i.e., of the unlabeled data). In the semi-supervised part, the modeling of the classifier based on easy to estimate metrics is novel, as well as the aggregate predictions based on this classification model and the learning algorithm.

System Description

Figure 1:
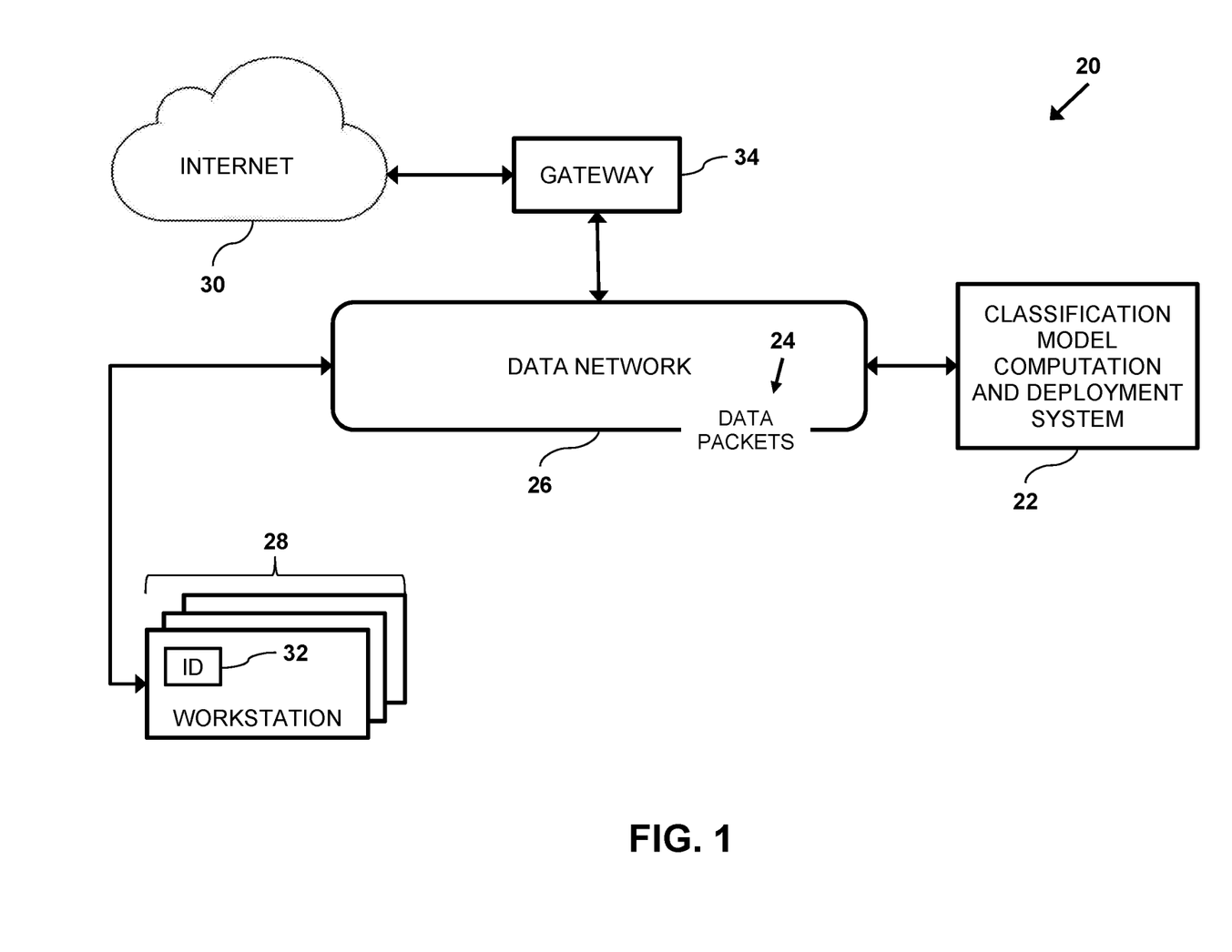
FIG. 1 is a block diagram that schematically shows a computing facility comprising a classification model computation and deployment system that comprises a framework for performing supervised learning when no labeled data is provided, in accordance with an embodiment of the present invention.

FIG. 1 is a block diagram that schematically shows a computing facility 20 comprising a computer system 22 (also referred to herein as classification model computation and deployment system 22) that monitors data packets 24 transmitted between multiple entities coupled to a data network 26, in accordance with an embodiment of the present invention. In the example shown in FIG. 1, the entities comprise workstations 28 and a public network 30 such as the Internet. In embodiments of the present invention as described hereinbelow, computer system 22 is configured to analyze initial data packets 24 in order to generate a cybersecurity attack detection classification model, and to deploy the classification model to identify subsequent data packets 24 that comprise cybersecurity attacks on network 26.

Each workstation 28 comprises a workstation ID 32 such as a media access control (MAC) address or an Internet Protocol (IP) address that can be used to uniquely identify each of the workstations. Workstations 28 communicate over data network 26 (e.g., a local area network) that is also coupled to an Internet gateway 34. Examples of workstations 28 include personal computers and servers comprising respective central processing units, memories, and network interface controllers (not shown) which connect the workstations to network 27. Gateway 34 couples computing facility 20 to public networks 30 such as the Internet, and comprises communications circuitry (not shown) that enables communication between workstations 28 and sites/computers (not shown) on the Internet.

Figure 2:
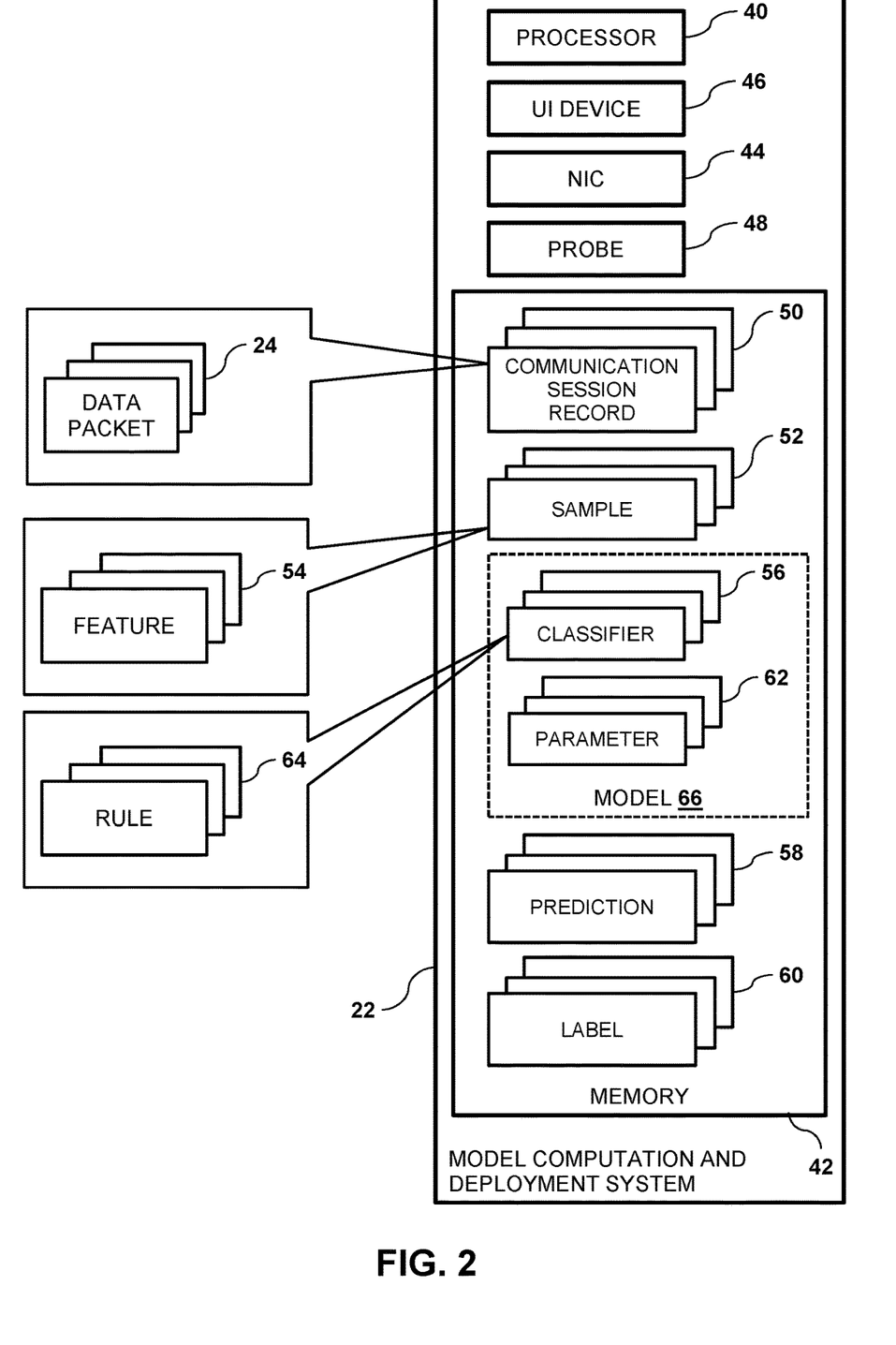
FIG. 2 is a block diagram that schematically shows the classification model computation and deployment system, in accordance with an embodiment of the present invention.

FIG. 2 is a block diagram that schematically shows computer system 22, in accordance with an embodiment of the present invention. Computer system 22 comprises a processor 40 and a memory 42, which are coupled by a system bus (not shown) to a network interface controller (NIC) 44 that couples the computer system to network 26. In some embodiments, computer system 22 may comprise a user interface (UI) device 46 (e.g., an LED display) or another type of output interface. Examples of memory 42 include dynamic random-access memories and non-volatile random-access memories. In some embodiments, memory 42 may include non-volatile storage devices such as hard disk drives and solid-state disk drives.

In the configuration shown in FIG. 2, computer system 22 comprises a probe 48 that collects information on data packets 24 transmitted over network 26. While the example in FIG. 2 shows probe 48 as a module of computer system 22, the probe can be implemented either as a standalone device coupled to network 26, or as a module in another device coupled to the network. Using probe 48 to collect data packets 24 from network 26 and processing the collected data packets to extract information is described, for example, in U.S. Patent Application 2014/0165207 to Engel et al. and U.S. Patent Application 2015/0358344 to Mumcuoglu et al., whose disclosures are incorporated herein by reference.

In operation, processor 40 is configured to collect the data packets from probe 48, to group the data packets into communication session records 50 (also referred to herein simply as communication sessions 50), and to store the communication session records to memory 42. As described hereinbelow, processor 40 can extract sample sets 52 (also referred to herein simply as samples 52) of features 54 for each communication session 50, and store the sample sets of the features to memory 42. Each feature 54 has a respective value, and communication sessions 50 and sample sets 52 have a one-to-one correspondence.

Memory 42 also stores a plurality of classifiers 56 that processor 40 can apply to sample sets 52 in order to generate, and to store to the memory, respective predictions 58. In some embodiments, each classifier 56 may comprise a set of one or more rules 64 defined by one or more domain experts (i.e., people). These sets of rules 64 may also be referred herein as weakly-useful predictors 64. The weakly-useful predictors are typically used for classifying non-labeled data. In alternative embodiments, classifiers 56 may comprise classification models that processor 40 can generate using suitable supervised learning methods that include, but are not limited to, decision trees and support vector machines (SVM) once there are predictions that can be used as labels.

As described hereinbelow, processor 40 computes, and stores to the memory, a set of parameters 62 for classifiers 56 based on sample sets 52, predictions 58 and labels 60. Parameters 62 are described in the description referencing FIG. 3 hereinbelow.

In embodiments of the present invention, processor 40 can analyze features 54 in order to generate a model 66 which is a meta-classifier, as a function of the classifiers 56 and parameters 62. Model 66 can be deployed to detect and flag subsequent communication sessions that indicate malicious activity (e.g., a cybersecurity attack). These subsequent communication sessions comprise data packets 24 that can be collected from network 26 or from any other data network.

In some embodiments, the tasks of collecting the data packets, grouping the data packets into communication sessions 50, and analyzing the communication sessions to generate model 66 may be split among multiple devices within computing facility (e.g., workstations 28) or external to the computing facility (e.g., a data cloud based application).

Processor 40 comprises a general-purpose central processing unit (CPU) or special-purpose embedded processors, which are programmed in software or firmware to carry out the functions described herein. This software may be downloaded to the computer in electronic form, over a network, for example. Additionally or alternatively, the software may be stored on tangible, non-transitory computer-readable media, such as optical, magnetic, or electronic memory media. Further additionally or alternatively, at least some of the functions of processor 40 may be carried out by hardwired or programmable digital logic circuits.

While the configuration in FIGS. 1 and 2 shows computer system 22, and workstations 28 coupled to LAN 26, configurations where the classification model and deployment system and the workstations are coupled to any type of network (e.g., a wide area network or a data cloud) are considered to be within the spirit and scope of the present invention. In some embodiments, some or all of workstations 28 and computer system 22 may be deployed in computing facility 20 as virtual machines.

Classification Model Generation and Deployment

Figure 3:
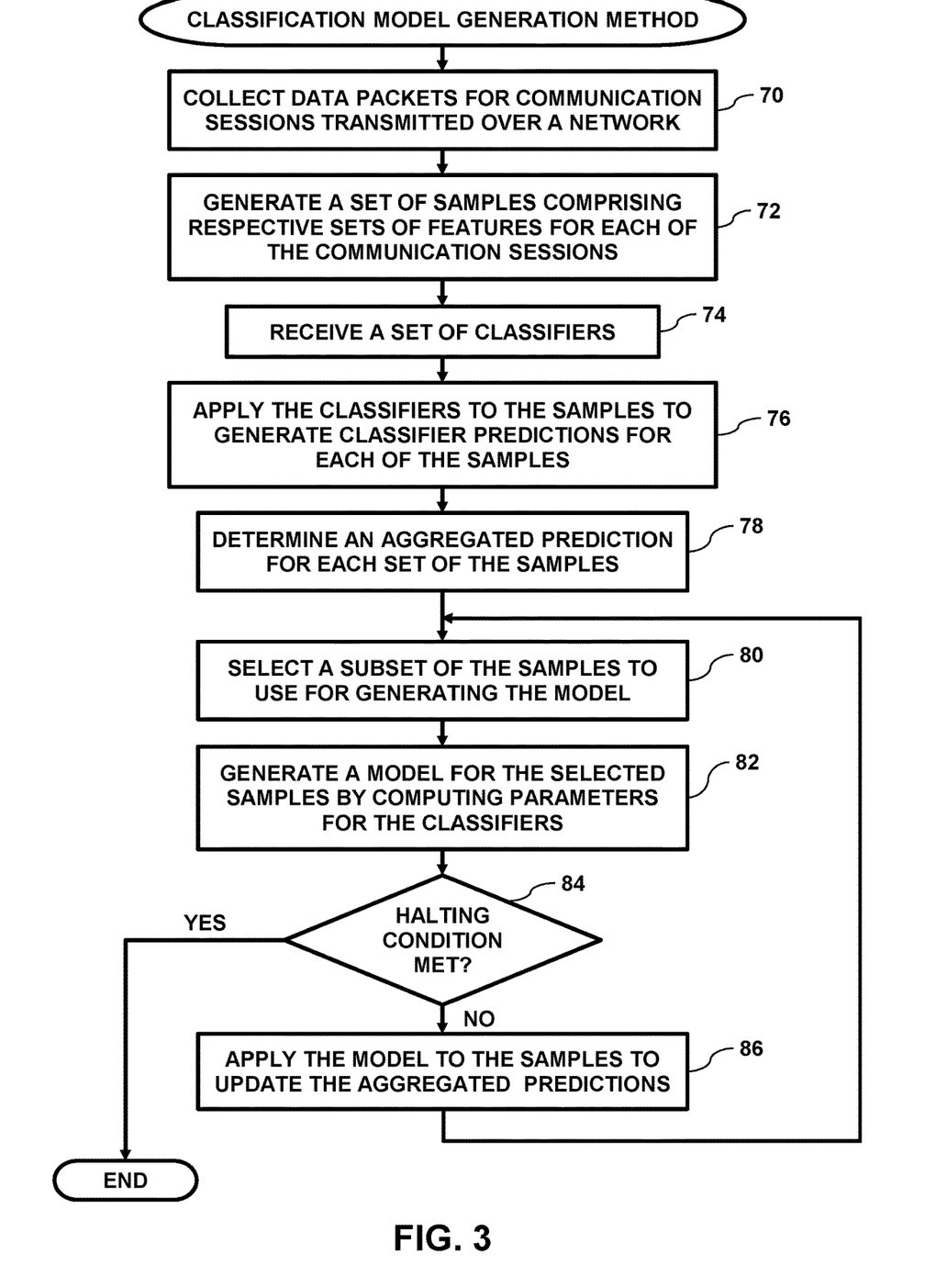
FIG. 3 is a flow diagram that schematically illustrates a method of using a unsupervised algorithm or a semi-supervised algorithm to generate a classification model, in accordance with an embodiment of the present invention.

FIG. 3 is a flow diagram that schematically illustrates a method for generating model 66, in accordance with an embodiment of the present invention. In some embodiments, model 66 can be used to detect malicious activity such as bind shell attacks.

In a collection step 70, processor 40 uses probe 48 to collect data packets 24 from network 26, and groups the collected data packets into communication sessions 50. In the example shown in FIG. 1, the communication sessions comprise data packets 24 transmitted between a pair of networked entities such as workstations 28, or between the Internet 30 (i.e., a computer on the Internet) and a given workstation 28. Examples of sessions 50 include, but are not limited to, TCP sessions or a logical action such as a file transfer within an open TCP session, which can be followed by additional actions.

In a generation step 72, processor 40 generates a plurality of samples 52 by computing a plurality (e.g., at least 10 or at least 20) features 54 for the communication session records. In embodiments of the present invention, the features in each given sample 52 are from one or more communication session records 50.

In one embodiment, processor 40 can generate a given feature 54 by extracting data from a given data packet 24 of a given communication session 50. For example, the given feature may comprise a start time of the given communication session. In another embodiment, processor 40 can generate a given feature 54 by computing a value based on information stored in multiple data packets 24 of a given communication session 50. For example, the given feature may comprise an amount of data transmitted in the given communication session. Additional examples of features 54 include, but are not limited to, durations of the communication sessions, source and destination IP addresses of the communication sessions and protocols used for the communication sessions.

In a receive step 74, processor 40 receives a plurality of classifiers 56. In some embodiments as described supra, each classifier 56 comprises a given weakly-useful predictor 64, as presented in "Avrim Blum and Tom Mitchell, Combining labeled and unlabeled data with co-training, In the Proceeding COLT' 98 Proceedings of the eleventh annual conference on Computational learning theory, Pages 92-100." A weakly useful predictor comprises a predictor that (a) predicts positives for a non-negligible subset of the data, (b) generates predictions that are significantly better than random guesses.

In some embodiments, the weakly-useful predictors can be defined by domain experts that are familiar with the goal of the classification model (e.g., bind shell detection), and therefore know what features to analyze (e.g., (a) a volume of data in the communication sessions>X, and (b) a time delta between communication sessions>Y). Weakly-useful predictors 64 that can be used in embodiments of the present invention are described in further detail in Appendices 1 and 2, hereinbelow. In other embodiments, the classifiers may comprise dynamic classifiers.

In a classifier application step 76, processor 40 applies classifiers 56 to samples 52, thereby generating predictions 58. Therefore, each given classifier 56 generates a respective prediction 58 for each given sample 52 (and therefore for each corresponding communication session 50).

In an aggregation step 78, processor 40 aggregates, for each of the samples, the classifier predictions into a single aggregated prediction. These aggregated predictions can be used for computing metrics such as classifier precisions and positive rates. To aggregate the predictions for each sample 52, processor 40 can use metrics such as (a) an upper and/or lower threshold percentage for the classifications' (b) a threshold for a Naïve Bayes probability (using the classifiers as described hereinbelow), and (c) a cost threshold (cost is described hereinbelow). For example, the aggregate prediction for a given sample 52 can be positive if a threshold percentage of the predictions, by the classifiers, for the given sample are "positive" (i.e., suspected of indicating malicious activity).

In a selection step 80, processor 40 selects a subset of samples 52 that the processor can use to build model 66. In one embodiment, processor 40 can select the subset by selecting an active learning dataset, and use the labeled active learning data set to build model 66 as described in the description referencing FIG. 4 hereinbelow. In another embodiment, processor 40 can select the subset by selecting the samples that were predicted (i.e., by the aggregated predictions) with high confidence.

In some embodiments, the high confidence comprises a threshold percentage (e.g., a fixed value such as 60%, 65%, 70%, 75%, 80%, 85% or 90%) of the classifiers voting true (i.e., suspicious) or false (i.e., not suspicious). In additional embodiments, processor 40 can adjust the threshold percentage in order to select a specific percentage (e.g., 2%) of the samples. In further embodiments, processor 40 can adjust the threshold percentage in order to select a number of the samples so that the number is within a specified numeric range (e.g., 400-500). Additional information on selecting the subset of positive samples 52 is described hereinbelow in Appendix 3.

In a model generation step 82, processor 40 computes, for the selected subset, respective parameters 62 for classifiers 56, thereby generating model 66. Examples of parameters 62 include, but are not limited to, a positive rate (i.e., a single scalar), precisions (i.e., a scalar for each of the classifiers), and hit rates (a scalar for each of the classifiers).

In one embodiment, processor can generate model 66 by computing a Naïve Bayes probability score for each of the classifiers (and therefore generating a Naïve Bayes classifier), as described in Appendix 4, hereinbelow. In other embodiments, processor 40 can use other classifier aggregation methods, such as applying, to the classifiers, a linear regression algorithm or a logistic regression algorithm.

In a decision step 84, if a halting condition is met, then the method ends. In embodiments of the present invention, processor 40 typically requires a number of iterations (i.e., of steps 78-84) to compute parameters 62. In one embodiment, the halting condition comprises performing a specific number of iterations (e.g., 4, 5, 6 or 7).

In another embodiment, the halting condition comprises detecting minimal changes in parameters 62 (i.e., in the latest iteration). For example, the halting condition comprises minimal changes in the computed precision of the classifiers. Computing the precision is described in the description referencing step 86 hereinbelow. In one embodiment of this example, the minimal changes in the precision of the classifiers comprise a minimal change of the average precision of the classifiers. In a second embodiment of this example, the minimal changes in the precision of the classifiers comprise a minimal change of the average precision of the majority of the classifiers. In these embodiments the minimal changes can be a threshold such as less than 2%, less than 3%, less than 4% or less than 5%.

In further embodiments, the halting condition may comprise detecting a minimal change (e.g., less than 2%, less than 4% or less than 5%) in the predictions (i.e., for all the samples) of classification model 66).

However, if the halting condition has not been met in step 84, then in a model application step 86, processor 40 applies model 66 to each sample 52, thereby generating respective current estimates of the aggregated predictions for the samples corresponding to the communication sessions, and the method continues with step 80 in order to select a new subset of samples 52.

As described in the description referencing step 80 hereinabove, processor 40 can initially select (i.e., based on whether or not processor 40 uses any labeled samples 52 to compute model 66) a subset of the samples by selecting an active learning dataset (i.e., a plurality of labeled samples 52) or by selecting a subset of samples 52 having positive predictions 58 (i.e., when there are no labels 60 for the samples). In some embodiments when performing step 80 following step 86, processor can compute an aggregate score (i.e., an aggregate prediction) for each prediction 58 generated by model 66 (i.e., for each sample 52), and select the samples based on their respective aggregate scores. Alternatively, any other suitable method for selecting the most informative samples 52 for labeling/prediction may be used.

To compute the aggregate score for each of the predictions, processor 40 can use the following formula:

$$\text{value} = \text{benefit} * P(\text{positive} \mid s) = \qquad (1)$$

$$\text{benefit} * P(\text{positive}) * \prod_{c_i(s)=1} \frac{\text{precision}_i * \text{hit\_rate}_i}{P(\text{positive})} * \prod_{c_i(s)=0} 1 - \frac{\text{precision}_i * \text{hit\_rate}_i}{P(\text{positive})}$$

where s comprises all the predictions by the classifiers (i.e., for each given classifier $c_i$), and benefit comprises a fixed value.

The score computed by Equation (1) will typically have higher values for positive predictions and lower values for negative predictions. During iterations for computing model 66 (i.e., when step follows step 66), processor 40 can set high and/or low sample selection thresholds for the computed aggregate score when selecting the samples to be used to compute model 66. For example, processor 40 can select the samples whose respective value scores are in the top 10% or 20% (i.e., for positive predictions) and in the bottom 10% or 20% (i.e., for negative predictions).

In one embodiment, benefit comprises a fixed value that represents a cost. For example, if the value of missing a positive sample is five time higher than mistakenly alerting on a negative sample, the benefit can be set to "5". This benefit factor can make the computed value large and less sensitive to errors.

In operation, the benefit can be used to adjust the number of false positives and false negatives in the predictions computed by model 66. In an alternative embodiment, benefit can be set to "1", and processor 40 can adjust the sample selection thresholds in order to select a specific number (or percentage) of samples 52 to use when computing model 66.

In some embodiments, precision can be estimated by labeling the hits of a given classifier 56. Since the hits are given, even on the unlabeled samples 52, the samples can be sampled to obtain an estimate of the precision. If the precision is bounded using confidence interval, an interval whose size is $$O\left(\frac{1}{\sqrt{n}}\right)$$

can be obtained. Hence, when bounding the size of the interval, the sample complexity is $O(n^2)$.

In some embodiments, processor 40 can (i.e., when performing step 80 after performing step 86) select the subset to be used for generating model 66 based on the computed aggregate predictions.

While a method for aggregate predictions has been described supra, processor 40 can compute predictions even if a specific classifier 56 is removed, since the predictions are based on aggregation. Additionally, since the aggregation is multiplicative, the new aggregation does not need to be computed from scratch but can simply be extracted from the aggregation and the classifier. Using this method, the performance of a classifier can be estimated without taking into account its own prediction, as done in the expectation-maximization (EM) algorithm.

Details on the derivation of Equation (1) are described hereinbelow in Appendix 4. Details on optimizing the consistency of parameters during the iterations for generating model 66 are described hereinbelow in Appendix 5.

Upon completing the steps described in FIG. 3, processor 40 can deploy model 66 in order to identify and generate alerts for any subsequent communication sessions that are suspected of indicating malicious activity (e.g., a cybersecurity attack such as forward shell), and the method ends. For example, processor can generate the alert by presenting, to a system administrator, a notification on UI device 46. While for purposes of simplicity, embodiments described herein use computer system 22 to generate and deploy model 66 on network 26, deploying the model on a different computer coupled to analyze data packets 24 transmitted over a different network is considered to be within the spirit and scope of the present invention.

Active Learning

As described in the description referencing step 80 in FIG. 3 hereinabove, processor 40 can select a subset comprising an active learning dataset. To select the active learning dataset, processor 40 can use any suitable method of active learning, such as methods described in Active Learning Literature Survey B. Settles Computer Sciences Technical Report 1648, University of Wisconsin-Madison, 2009. The intuition behind most active learning dataset selection algorithms is that the more uncertain one is regarding a sample, the more informative its label will be. Embodiments described herein present a new algorithm whose novelty is the consideration of all samples 52 (and not one by one as required when working with a stream) and a bound on the set size.

Figure 4:
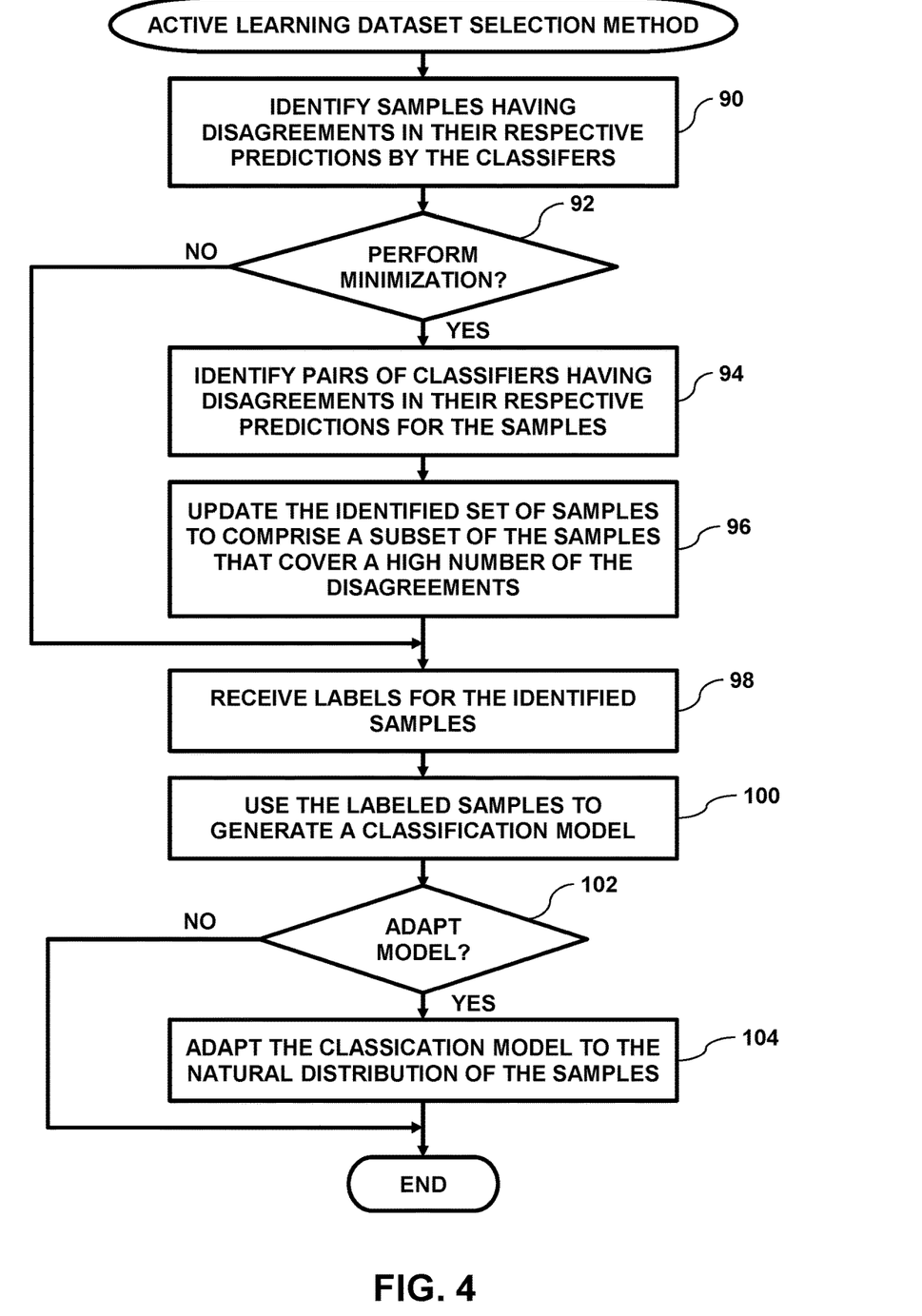
FIG. 4 is a flow diagram that schematically illustrates a method of selecting an active learning dataset that can be used for generating the classification model, in accordance with an embodiment of the present invention.

FIG. 4 is a flow diagram that schematically illustrates a method of selecting samples 52 for an active learning dataset that processor 40 can use for generating model 66, in accordance with an embodiment of the present invention. In an identification step 90, processor 40 identifies a plurality of samples 52 that have disagreements in their respective predictions 58 by classifiers 56. For example, if there are three classifiers, samples that were flagged (i.e., as suspicious) by one or two of the classifiers are identified.

In a comparison step 92, if minimization is being performed, then in an identification step 94, processor 40 identifies pairs of classifiers 56 that disagree when generating the predictions in step 76, and in an update step 96, the processor updates the identified samples to comprise a subset of the samples that cover a high number (e.g., at least 75%, at least 80%, at least 85% or at least 90%) of the identified pairs of the disagreeing classifiers. In one embodiment, the subset may comprise a small target number (e.g., 100, 150, 200 or 250) of samples 52, or small target number ranges (e.g., 100-125, 125-150, 150-200 or 200-250) of the samples. In another embodiment, the subset may comprise a small target percentage (e.g., 0.1%, 0.5%, 1% or 2%) of the samples. For example, if there are four classifiers 56A 56B, 56C and 56D, and for a given sample 52, classifier 52A votes true, and classifiers 56B-D vote false, then there are three pairs of disagreeing classifiers (i.e., 56A-56B, 56A-56C and 56A-56D) that produce disagreeing predictions 58 for the given sample.

In some embodiments, the active learning algorithm described hereinbelow may be based on two ideas. The first is a representation of disagreements as described in A. Dhagat and L. Hellerstein, "PAC learning with irrelevant attributes", in 'Proceedings of the IEEE Symp. on Foundation of Computer Science', 1994. The second idea is the use of the classic set cover greedy approximation algorithm (as described in Vašek Chvátal. A greedy heuristic for the set-covering problem (1979). Mathematics of operations research). Due to the approximation bound of the set cover algorithm, there are bounds on the number of samples 52 for active learning and for the number of features.

A goal of this new algorithm is the return a set of samples covering many disagreements among the classifiers. In the algorithm:

Let $C_1 \ldots C_n$ be the set of classifiers 56.
Let D be the set of samples 52.
Define $Cover_s$ as a set of pair of classifiers 56 whose disagreement is covered by s. Hence, $Cover_s$ is the set of all pairs of classifiers 56 that disagree on s.
Build a set of possible classifiers disagreements. Note that this set is symmetric (i.e., we will have both (a,b) and (b,a) but the algorithm is indifferent to that).
Build coverage sets that comprise sets of disagreements between classifiers 56 covered by each sample 52. A "sample cover" a disagreement between two classifiers 56 if they disagree on it (i.e., the sample). Hence, getting the true label of this sample will provide information regarding an error of one of the classifiers.

The following pseudocode implements the algorithm described supra that return the set of samples 52 covering many disagreements among the classifiers:

```
For each s ∈ D
    For i in 1..n
        For j in 1..n
            If  C_i(s) ≠ C_j(s) :
                ▪ Append (i,j) to Cover_s #Build coverage sets;
                ▪ Append (i,j) to S # Build a set of possible
                  classifiers disagreements
            EndIf
```

Apply the set cover algorithm (as described in Vašek Chvátal. A greedy heuristic for the set-covering problem (1979). Mathematics of operations research);
Use the set cover algorithm to cover S using the Cover sets;

Due to the correctness of the set cover algorithm, the set cover algorithm will return a subset of samples 52 covering all disagreements between pairs of the classifiers. The size of this feature set will be at most of factor $O(\log m)$ of the minimal set. The subset of samples 52 has a size $O(n^2)$. The complexity of the set cover algorithm is $O(m*\log(m))$ (where m is the optimal cover. The parameter m is bounded by n so the size of the feature set might end up being $O(n^2*\log(n))$.

In the set cover algorithm described hereinabove, equal weights were given to each of the classifier disagreements. The algorithm can work when assigning different weights as well. One useful variant is to assign a weight based on an uncertainty based on metrics of model 66.

Returning to the flow diagram, in a labeling step 98, processor 40 receives labels 60 for the identified samples that comprise an active learning dataset. To receive the labels, processor 40 can convey these samples to one or more domain experts, who can manually label the samples, and convey the labels back to computer system 22.

In a generation step 100, processor 40 can apply any supervised learning algorithm to generate, using the samples in the active learning dataset and their respective labels 60, to generate classification model 66. In an alternative embodiment, processor can use the labeled samples in the active learning dataset for generating classification model 66 using any semi-supervised learning algorithm. For example, if processor 40 is using a given semi-supervised learning algorithm in the description referencing FIG. 3 hereinabove, the processor can use the labeled samples in the active learning dataset for the first instance of the selecting the subset and generating the model, as described in steps 80 and 82.

In an evaluation step 102, if adapting model 66 (i.e., comprising classifiers 56) is being performed, then in an adaptation step 104, processor 40 adapts the initial version of the classification model to a natural distribution of samples 52, and the method ends. Adapting classification model 66 is described in the description referencing FIG. 5 hereinbelow. As described hereinbelow, in addition to adapting the classifiers, processor 40 also updates the set of samples in the active learning dataset.

Returning to step 100, if adapting the classification model is not being performed, then the method ends. Returning to step 92, if optimization is not being performed, then the method continues with step 98.

Classification Model Adaptation

In some embodiments, processor 40 can select additional samples for labeling, in a manner such that the distribution of the subset of samples and use them to make the classification model perform better on the distribution of the original sample set. Embodiments described herein are based on 'Schapire, Robert E. (1990), "The Strength of Weak Learnability" (PDF). Machine Learning, Boston, Mass.: Kluwer Academic Publishers, 5 (2): 197-227' may be used for this purpose.

Figure 5:
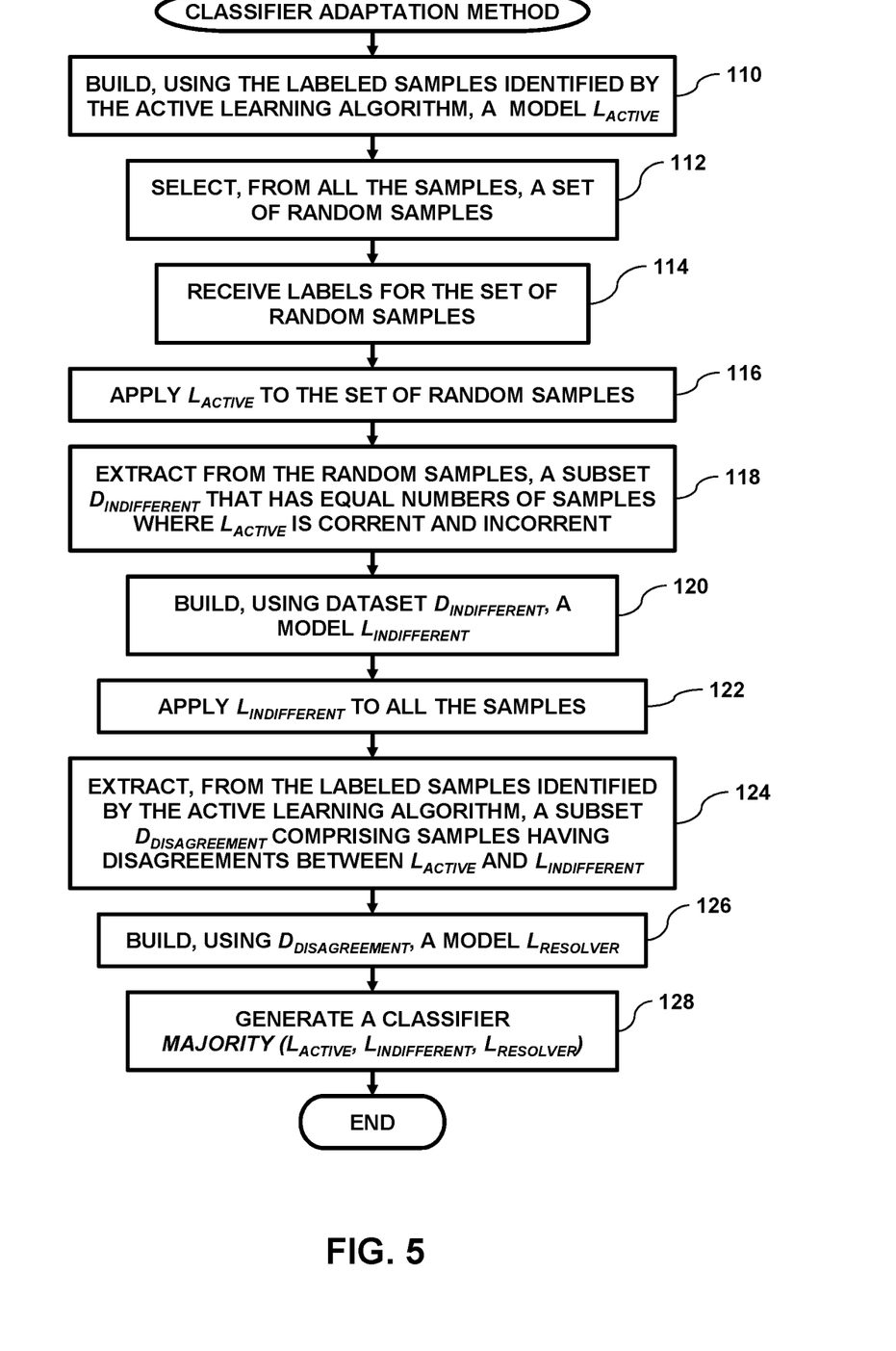
FIG. 5 is a flow diagram that schematically illustrates a method of adapting, for the classification model, classifiers to a natural distribution of the samples, in accordance with an embodiment of the present invention.

FIG. 5 is a flow diagram that schematically illustrates a method of adapting classifiers 56 to the natural distribution of samples 52, in accordance with an embodiment of the present invention. In this flow diagram, $D_{natural}$ comprises a dataset of unlabeled samples 52 from the natural distribution, and $D_{active}$ comprises a dataset of labeled samples 52 chosen by the active learning algorithm (i.e. as described in the description referencing FIG. 4, hereinabove).

In a build step 110, processor 40 uses $D_{active}$ to build a model $L_{Active}$, and in a selection step 112, the processor selects a set of random samples 52 from $D_{natural}$. In a receive step 114, processor 40 receives labels for the selected set of random samples (e.g., using embodiments described in the description referencing FIG. 4 hereinabove), and in an application step 116, the processor applies $L_{Active}$ to the set of random samples.

In a first extraction step 118, processor 40 extracts, from the set of random samples selected from $D_{natural}$, a subset $D_{indifferent}$ that has equal numbers of samples 52 where $L_{Active}$ is correct and incorrect (i.e., based on the received labels), and in a build step 120, the processor uses $D_{indifferent}$ to build a model $L_{indifferent}$. In an application step 122, processor 40 applies model $L_{indifferent}$ to the samples in $D_{natural}$, and in an extraction step 124, the processor extracts, from $D_{natural}$, a subset $D_{disagreement}$ comprising samples 52 having disagreements in their respective predictions by $L_{Active}$ and $L_{indifferent}$.

Finally, processor 40 uses $D_{disagreement}$ to build a model $L_{resolver}$ in a building step 126, and generates a new "adapted" classification model 66 Majority($L_{Active}$, $L_{indifferent}$, $L_{resolver}$) in a model generation step 128, and the method ends. To build models $L_{Active}$, $L_{indifferent}$ and $L_{resolver}$ (i.e., as described in steps 110, 120 and 126), processor 40 can any supervised learning method (e.g., a boosting algorithm.

Note that the sample collection for $D_{indifferent}$ can depend on $L_{Active}$'s performance on $D_{Active}$. In case of extreme accuracies (close to 1 or 0), the number of the samples will be very high. However:

If $L_{Active}$ accuracy on $D_{natural}$ is close to 1, use classifiers 56 (i.e., without any adaptation) as is.
2. If $L_{Active}$'s accuracy on $D_{natural}$ is close to 0, something is not working (e.g., bad performance to start with, too far distributions). The benefit from the boosting will probably not be high enough so it is better to discard the generated adapted classifier, and to perform the steps in FIG. 4 again in order to generate a new adapted classifier.
3. Processor 40 can use the generated adapted classifier if it has mediocre accuracy, and can nicely bound the number of samples to label.

APPENDIX 1—CLASSIFIER REPRESENTATION

In some embodiments, classifiers 56 may be close in spirit to the Dawid-Skene model (as described in Dawid and Skene (1979). Maximum Likelihood Estimation of Observer Error-Rates Using the EM Algorithm. Journal of the Royal Statistical Society. Series C (Applied Statistics), Vol. 28, No. 1, pp. 20-28).

Additionally, a given classifier 56 may be represented by its predictions, its correctness when prediction positive (the precision, P(p=c|p=positive) and its hit rate P(p=positive). One reason that these measures are used (i.e., and not the more common precision & recall) is that it is easier to estimate them in unsupervised frameworks. Precision, which is used in both models, is easy to estimate by sampling the hits. In an imbalanced situation (e.g., if there are many negative predictions and almost no positive predictions), estimating recall by getting the number of positives or even estimating their ratio might require labeling a huge number of samples.

APPENDIX 2—WEAKLY-USEFUL PREDICTORS

Since samples 52 are not typically labeled, and the goal is to obtain classifiers 56, the information used to define classifiers 56 can be obtained from an external source. In some embodiments, domain knowledge can be used to construct a "weakly-useful predictor" (as described in Avrim Blum and Tom Mitchell, Combining Labeled and Unlabeled Data with CoTraining, In the Proceeding COLT' 98 Proceedings of the eleventh annual conference on Computational learning theory, Pages 92-100.)

A weakly-useful predictor is an extension of weak learners for imbalanced scenarios (as described in Michael Kearns; Leslie Valiant (1989), "Crytographic limitations on learning Boolean formulae and finite automata", Symposium on Theory of computing. ACM. 21: 433-444, doi: 10.1145/73007.73049). A given weakly-useful predictor 64 is typically required to have a non-negligible hit rate and a precision better than the positive rate by a non-negligible additive value. These classifiers 56 (i.e., the weakly useful predictors) may comprise strict rules 64 having good performance though not obtained due to learning. The following are some examples of the weakly-useful predictors that can be used for detecting a bind shell attack:

Since the payload cannot be tiny in order to use the vulnerability, the rule "Phase1 volume>10 k" is an example of a given weakly-useful predictor 64.

Since this is the common implementation, the rule "Session1 end<Session2 start", is another example of a given weakly-useful predictor 64.

Based on domain knowledge, these rules are typically unrelated and independent given the concept, and the dataset (i.e., the samples) can be used to verify this independence. The use of the weakly-useful predictor is similar to the use of labeling functions (as described in Ratner, A.; De Sa, C.; Wu, S.; Selsam, D.; and Re, C. 2016, Data Programming: Creating Large Training Sets, Quickly, arXiv preprint arXiv:1605.07723.), with an additional guarantee regarding the performance. Note that the weakly-useful predictor can be learned from (i.e., fitting) the data, and is not necessarily a pre-defined rule. In embodiments of the present invention, the weakly-useful predictors may comprise dynamic classifiers or classifiers produced by domain (i.e., cybersecurity) experts.

APPENDIX 3—FINDING POSITIVES

Upon defining and applying the weakly-useful predictors, computer system 22 has some weakly-useful predictors 64 but no labels (i.e., predictions 58) for samples 52. Since the vast majority of samples 52 are benign (negative), one challenge is to find malicious (i.e., positive) samples 52. While there may be an intuitive estimation of the respective performance of each of the weakly-useful predictors (e.g., precision, recall), the exact performance is not important for embodiments of the present invention. For example, if a given weakly-useful predictor 64 predicts positive, the probability of a true positive is higher. Therefore, the more rules 64 that indicate that a given sample 52 is positive, the more likely that the given sample is a true positive.

In operation, processor 40 can start to identify positives by labeling the samples that have high numbers of rules 64 that indicate positivity. In this case, processor 40 can identify some positive samples 52. However if processor 40 cannot identify a useful number of samples 52, it might be necessary to find better weakly-useful predictors 64.

In some embodiments, processor 40 can independently sample hits of each rule 64, and determine a precision estimation for each rule (i.e., in addition to a positive indication). While precision estimations are valuable, many useful rules 64 will typically have relatively low precision when used independently. Therefore, this strategy will probably not lead to enough positives.

In some embodiments, semi-supervised learning can be used in order to leverage the performance estimates in order to identify more positives. This scenario can be treated as Positive and Unlabeled (PU) learning, given that the negative samples are so common (i.e., flip the concept and make them positive). In additional embodiments (as described in Francois Denis PAC Learning from Positive Statistical Queries, Proc. 9th International Conference on Algorithmic Learning Theory—ALT '98. Pages 112-126), PU learning can be reduced to statistical learning. However, since the collected communication sessions (i.e., the samples) is typically (very) imbalanced, the required accuracy in the statistical queries may not by realistically achieved.

APPENDIX 4—AGGREGATING PREDICTIONS

Each of the samples (i.e., communication sessions) 50 in the active dataset has a prediction from each classifier 56. Now it should be decided how to aggregate the predictions of all the classifiers into a single one. In one embodiment, it is assumed that the classifiers are independent given the concept. This assumption is used in the classical Naïve Bayes classifier and used to prove PAC learnability of co-training (as described in Avrim Blum and Tom Mitchell. Combining Labeled and Unlabeled Data with CoTraining. In the Proceeding COLT'98 Proceedings of the eleventh annual conference on Computational learning theory. Pages 92-100). Since the concept is not available when defining the model, the conditional independence assumption cannot be validated. However, there are many methods (e.g., checking for independence, using domain knowledge and checking for conditional independence on the biased active learning dataset) that are insightful.

To observe the probability of getting a set of the classifiers' hits on a given sample 52, either: (a) the hidden concept was positive and the classifiers predicted correctly (i.e., and therefore the others were wrong), or (b) the sample was negative and all hits are wrong and all not hits are right.

Writing that formally:

$$P(\text{positive}|s) = \frac{P(s|\text{positive}) * P(\text{positive})}{P(s)} \text{ using Bayes' theorem}$$

where P(s) is fixed so it can be ignored when comparing predictions, as shown here:

$$P(\text{positive}|s) \approx P(s|\text{positive}) * P(\text{positive})$$

$$= P(\text{positive}) * P(\text{hits are correct, none hits are wrong})$$

If conditional independence is assumed, then $$P(\text{positive}|s) \approx P(\text{positive}) * \prod P(c_i|\text{positive})$$

$$= P(\text{positive}) * \prod_{c_i(s)=1} P(c_i|\text{positive}) * \prod_{c_i(s)=0} P(c_i|\text{positive})$$

$$= P(\text{positive}) * \prod_{c_i(s)=1} \text{recall}_i * \prod_{c_i(s)=0} 1 - \text{recall}_i$$

Similarly:

$$P(\text{negative}|s) \approx (1 - P(\text{positive})) * P(\text{hits are wrong, none hits are correct})$$

$$= (1 - P(\text{positive})) * \prod P(c_i|\text{negative})$$

$$= (1 - P(\text{positive})) * \prod_{c_i(s)=1} fpr_i * \prod_{c_i(s)=0} 1 - fpr_i$$

Therefore, the probabilities can be estimated using P(positive) and the recall and a false positive rate (fpr) of each of the classifiers. Unfortunately, as explained before there may be a problem computing them.

At this point, the Bayes' theorem can be used again:

$$P(A|B) = \frac{P(B|A)P(A)}{P(B)}$$

$$recall_i = P(c_i = 1 | positive) =$$

$$\frac{P(positive | c_i = 1) * P(c_i = 1)}{P(positive)} = \frac{precision_i * hit\_rate_i}{P(positive)}$$

$$fpr_i = P(c_i = 1 | negative) =$$

$$\frac{P(neative | c_i = 1) * P(c_i = 1)}{P(negative)} = \frac{(1 - precision_i) * hit\_rate_i}{1 - P(positive)}$$

Substituting the expressions for recall and fpr into the probabilities expressions results in:

$$P(positive | s) \approx P(positive) * \prod_{c_i(s)=1} recall_i * \prod_{c_i(s)=0} 1 - recall_i =$$

$$P(positive) * \prod_{c_i(s)=1} \frac{precision_i * hit\_rate_i}{P(positive)} * \prod_{c_i(s)=0} 1 - \frac{precision_i * hit\_rate_i}{P(positive)}$$

$$P(negative | s) \approx$$

$$(1 - P(positive)) * \prod_{c_i(s)=1} \frac{(1 - precision_i) * hit\_rate_i}{1 - P(positive)} * \prod_{c_i(s)=0} 1 - \frac{(1 - precision_i) * hit\_rate_i}{1 - P(positive)}$$

At this point, formulas have been defined for:

P(positive|s) and P(negative|s) using $precision_i$, $hit\_rate_i$ and P(positive).

The hit rate can be evaluated using the unsupervised communication session data, and the precision can be estimated by labeling hits, but estimating the positive ratio is a problem that can be declared as basic.

It is important to note that the value we miss is a single scalar comprising the positive rate. More than that, the supervised learning will lead to predictions that we can verify. Therefore, binary searches can be used in order to validate which value leads to optimal results. Additionally, the cost of a false negative is much higher than a false positive (i.e., if this were not true, then the majority rule would have been an adequate classifier). As show in Equation (1) presented supra, combining the cost can be performed by multiplying the positive probability by a benefit factor, larger than 1 (and usually much larger). Of course, we can also estimate the positive rate using the expectation-maximization procedure.

APPENDIX 5—OPTIMIZATION

The confidence that a given sample s is positive is:

$$\text{confidence}(s) = \frac{P(positive | s)}{P(positive | s) + P(negative | s)} \quad (2)$$

Goals of embodiments of the present invention include minimizing the uncertainty in the predictions (due to inconsistency among the classifiers), and maximizing the predictive power of the classifiers. Information theory terms can be used for this and for measuring the prediction uncertainty by the entropy and the predictive power by mutual information.

Wrapping up all the above, a goal is finding $$\text{minarg}_\theta H_{s \in Unlabeled}(\text{confidence}(s)) - I_{s \in Labeled}(\text{confidence}(s); \text{label}(s)) \quad (3)$$

where H stands for entropy, I stands for mutual information, θ includes the precision, the hit rate and the positive rate, and label(s) indicates the concept of the samples.

In equation 2, the entropy measures the level of disagreement among the classifiers, where "0" indicates full agreement. Mutual information I measures how well the classifiers fit a given label s. Minimizing the formula presented in equation (2) enables embodiments of the present invention to obtain classifiers that can predict a given label s with a high degree of consensus. Note that if no labels are available, minimizing this formula can lead to consistent classifiers. Since the classifiers are weakly useful predictors, their consistency leads to good predictions, even when there are no labeled samples.

Hence, it is important to maximize the difference between the prediction probabilities on the unlabeled dataset (i.e., the received data packets in the communication sessions) and minimizing the loss on the labeled data set (i.e., the active learning dataset). This formula can be used directly, and the optimization can be performed using stochastic gradient descent (as described in Coraluppi, G. and T. Y. Young (1969). Stochastic signal representation. Circuit Theory, IEEE Transactions on 16 (2), 155-161).

However, it may be preferable to use an algorithm close in spirit to co-training (as described in Avrim Blum and Tom Mitchell. Combining Labeled and Unlabeled Data with CoTraining. In the Proceeding COLT' 98 Proceedings of the eleventh annual conference on Computational learning theory. Pages 92-100), and Expectation-Maximization (as described in Dempster, A. P.; Laird, N. M.; Rubin, D. B. (1977). "Maximum Likelihood from Incomplete Data via the EM Algorithm". Journal of the Royal Statistical Society, Series B. 39 (1): 1-38. JSTOR 2984875. MR 0501537). The reason for is that if the assumptions of these algorithms hold, so do their guarantees. In particular, the co-training assumptions guarantee probably approximately correct (PAC) learning, as described in L. Valiant, A theory of the learnable. Communications of the ACM, 27, 1984.

It is important to note that since the unlabeled communication sessions leads to constraints on its own, the method can be used without any labeled data. This "look, no hands" variant is based on the consistency of the classifiers regardless of the prediction performance.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
collecting, by a processor, communication sessions comprising data packets transmitted over a network;
generating a plurality of samples from the collected data packets;
applying multiple classifiers to the samples, thereby computing a classifier prediction for each of the samples, each of the predictions indicating whether or not a given communication session indicates malicious activity;
determining, based on the classifier predictions, an aggregated prediction for each of the samples;
computing, based on the classifier predictions and the aggregated predictions, a precision and a hit rate for each of the classifiers and a positive rate;
selecting, based on the aggregated predictions, a subset of the samples;
computing, using the selected subset and based on the precisions and the hit rates of the classifiers and the positive rate, a classification model comprising the classifiers;
applying the classification model to the samples to update the classifier predictions and the aggregate predictions for the samples;
repeating over multiple iterations the steps of computing the precision and the hit rate, selecting the subset, computing the classification model and applying the classification model until a halting condition is met; and
scanning, using the classification model, additional communication sessions comprising additional data packets.

2. The method according to claim 1, wherein the classifiers comprise weakly-useful predictors defined by one or more domain experts.

3. The method according to claim 1, and comprising generating, using one or more semi-supervised learning methods, the classifiers.

4. The method according to claim 1, wherein selecting the subset comprises selecting a plurality of the samples that have predictions with a high confidence above a threshold percentage.

5. The method according to claim 1, wherein selecting the subset during the iterations comprises selecting a plurality of the samples that have disagreements in their classifier predictions, and comprising receiving manual labels for selected subset, wherein the predictions for the selected subset comprises the manual labels.

6. The method according to claim 5, and comprising adapting the classifiers to a natural distribution of the samples.

7. The method according to claim 1, wherein selecting the subset during the iterations comprises computing, for each given sample, a score based on the aggregate prediction for the given sample and the computed hit rates, precisions and positive rate.

8. The method according to claim 1, wherein computing the classification model comprises computing a Naïve Bayes probability using the classifiers.

9. The method according to claim 1, wherein computing the classification model comprises computing a score for each of the classifiers by applying a linear regression algorithm or a logistic regression algorithm to the classifiers.

10. The method according to claim 1, wherein the halting condition comprises detecting a minimal change in the predictions during the multiple iterations.

11. The method according to claim 1, wherein the halting condition comprises detecting minimal changes in the precisions during the multiple iterations.

12. The method according to claim 1, wherein the halting condition comprises repeating the steps of computing the precision and the hit rate, selecting the subset, computing the classification model and applying the classification model a specific number of times.

13. The method according to claim 1, wherein computing the classification model comprises computing parameters for the model that minimizes entropy less mutual information with a concept of the samples.

14. An apparatus, comprising:
a probe; and
at least one processor configured:
collect, from the probe, communication sessions comprising data packets transmitted over a network,
to generate a plurality of samples from the collected data packets,
to apply multiple classifiers to the samples, thereby computing a classifier prediction for each of the samples, each of the predictions indicating whether or not a given communication session indicates malicious activity,
to determine, based on the classifier predictions, an aggregated prediction for each of the samples,
to compute, based on the classifier predictions and the aggregated predictions, a precision and a hit rate for each of the classifiers and a positive rate,
to select, based on the aggregated predictions, a subset of the samples,
to compute, using the selected subset and based on the precisions and the hit rates of the classifiers and the positive rate, a classification model comprising the classifiers,
to apply the classification model to the samples to update the classifier predictions and the aggregate predictions for the samples,
to repeat over multiple iterations the steps of computing the precision and the hit rate, selecting the subset, computing the classification model and applying the classification model until a halting condition is met, and
to scan, using the classification model, additional communication sessions comprising additional data packets.

15. The apparatus according to claim 14, wherein the classifiers comprise weakly-useful predictors defined by one or more domain experts.

16. The apparatus according to claim 14, wherein the processor is configured to generate, using one or more semi-supervised learning methods, the classifiers.

17. The apparatus according to claim 14, wherein the processor is configured to select the subset by selecting a plurality of the samples that have predictions with a with a confidence above a threshold percentage.

18. The apparatus according to claim 14, wherein the processor is configured to select the subset during the iterations by selecting a plurality of the samples that have disagreements in their classifier predictions, and wherein the processor is configured to receive manual labels for selected subset, wherein the predictions for the selected subset comprises the manual labels.

19. The apparatus according to claim 18, wherein the processor is configured to adapt the classifiers to a natural distribution of the samples.

20. The apparatus according to claim 14, wherein the processor is configured to select the subset during the iterations by computing, for each given sample, a score based on the aggregate prediction for the given sample and the computed hit rates, precisions and positive rate.

21. The apparatus according to claim 14, wherein the processor is configured to compute the classification model by computing a Naïve Bayes probability using the classifiers.

22. The apparatus according to claim 14, wherein the processor is configured to compute the classification model by computing a score for each of the classifiers by applying a linear regression algorithm or a logistic regression algorithm to the classifiers.

23. The apparatus according to claim 14, wherein the halting condition comprises detecting a minimal change in the predictions during the multiple iterations.

24. The apparatus according to claim 14, wherein the halting condition comprises detecting minimal changes in the precisions during the multiple iterations.

25. The apparatus according to claim 14, wherein the halting condition comprises repeating the steps of computing the precision and the hit rate, selecting the subset, computing the classification model and applying the classification model a specific number of times.

26. The apparatus according to claim 14, wherein the processor is configured to compute the classification model by computing parameters for the model that minimizes entropy less mutual information with a concept of the samples.

27. A computer software product, the product comprising a non-transitory computer-readable medium, in which program instructions are stored, which instructions, when read by a computer, cause the computer:

to collect communication sessions comprising data packets transmitted over a network;

to generate a plurality of samples from the collected data packets;

to apply multiple classifiers to the samples, thereby computing a classifier prediction for each of the samples, each of the predictions indicating whether or not a given communication session indicates malicious activity;

to determine, based on the classifier predictions, an aggregated prediction for each of the samples;

to compute, based on the classifier predictions and the aggregated predictions, a precision and a hit rate for each of the classifiers and a positive rate;

to select, based on the aggregated predictions, a subset of the samples;

to compute, using the selected subset and based on the precisions and the hit rates of the classifiers and the positive rate, a classification model comprising the classifiers;

to apply the classification model to the samples to update the classifier predictions and the aggregate predictions for the samples;

to repeat over multiple iterations the steps of computing the precision and the hit rate, selecting the subset, computing the classification model and applying the classification model until a halting condition is met; and to scan, using the classification model, additional communication sessions comprising additional data packets.

* * * * *